United States Patent Office 3,334,157
Patented Aug. 1, 1967

3,334,157
POLYETHYLENE BLENDS CONTAINING TRACE AMOUNTS OF POLYTETRAFLUOROETHYLENE
Hans R. Larsen, Montreal, Quebec, Canada, assignor to Union Carbide Canada Limited, Toronto, Ontario, Canada, a corporation of Canada
No Drawing. Filed Dec. 3, 1963, Ser. No. 327,835
9 Claims. (Cl. 260—897)

ABSTRACT OF THE DISCLOSURE

Polyethylene is modified to improve its optical properties by blending finely-divided poly(tetrafluoroethylene) as an aqueous dispersion into the polyethylene. Polyethylene compositions containing from 0.015 percent to about 1.7 percent by weight of poly(tetrafluoroethylene) were prepared.

---

This invention relates to modified polyethylene having improved optical properties. More particularly, this invention relates to polyethylene modified by the addition of a minor amount of finely-divided poly(tetrafluoroethylene).

The use of polyethylene in the production of films for consumer packaging is well known. Such films are desirably characterized by low haze, high gloss, high "see-through," and low "milkiness," and various means for upgrading these optical properties of polyethylene film have been attempted.

In accordance with the instant invention, a modified polyethylene is produced which can be cast or extruded into films which are characterized by lower haze, higher gloss, higher "see-through," and lower "milkiness" than are films cast or extruded from the unmodified polymer from which it is produced. The improved appearance and clarity of films formed from the modified polyethylene of the instant invention makes them eminently suitable for use as packaging materials.

The modified polyethylene of the instant invention is produced by incorporating a minor amount of finely-divided poly(tetrafluoroethylene) into a polyethylene resin. This is accomplished by blending the polyethylene and poly(tetrafluoroethylene) at temperatures above the melting point of the polyethylene, but below the melting point of the poly(tetrafluoroethylene), i.e. the temperature at which it changes from a crystalline structure to an amorphous structure. Since poly(tetrafluoroethylene) melts at an extremely high temperature, above 300° C., it is impractical and economically unattractive to effect blending at temperatures above the melting point of the poly(tetrafluoroethylene). However, since homogeneous blends can unexpectedly be effected at the lower temperatures indicated, the instant invention provides an extremely attractive, commercially acceptable, method of blending polyethylene and poly(tetrafluoroethylene).

Conventional blending equipment can be employed in effecting blending according to the instant invention. By way of illustration, blending can be easily effected by means of a two-roll mill, or a Banbury mixer, or a Bolling mixer. The temperature employed should be above the melting point of the polyethylene, but below the melting point of the poly(tetrafluoroethylene). For example, temperatures of from about 110° C. to about 230° C., preferably from about 120° C. to about 190° C., are suitable.

The polyethylene employed in the instant invention can be either of the linear or branched-chain variety. However, regardless of the type of polyethylene employed, the polymer preferably has a melt index of from about 0.01 decigram/minute to about 30 decigrams/minute, and a density of from about 0.910 gram/cc. to about 0.965 gram/cc.

The poly(tetrafluoroethylene) employed in the instant invention preferably has a melting point of from about 320° C. to about 330° C. and a specific gravity of from about 2.1 gram/cc. to about 2.3 gram/cc. In any event the polymer should be finely-divided and preferably of a particle size no larger than about 1000 millimicrons, most preferably from about 100 millimicrons to about 500 millimicrons.

The amount of poly(tetrafluoroethylene) which will produce the maximum improvement in the optical properties of polyethylene depends upon the density of the polyethylene employed, with greater minimum amounts required the higher the density of the polyethylene. In general, for polyethylenes having a density of from about 0.910 gram/cc. to about 0.965 gram/cc. and a melt index of from about 0.01 decigram/minute to about 30 decigrams/minute, amounts of poly(tetrafluoroethylene) of from 0.015 percent by weight to greater than 1.7 percent by weight, based on the total weight of the mixture, give satisfactory results, although commercial considerations might serve to limit the concentration to a maximum of about 1.7 percent by weight.

When employing low density polyethylene, i.e. polyethylene having a density of from about 0.910 gram/cc. to about 0.925 gram/cc., an amount of poly(tetrafluoroethylene) of from 0.015 percent by weight to 0.333 percent by weight, preferably from 0.066 percent by weight to 0.134 percent by weight, based on the total weight of the mixture, give the most satisfactory results.

When a medium density polyethylene is employed, i.e. a polyethylene having a density of from about 0.926 gram/cc. to about 0.940 gram/cc., an amount of poly (tetrafluoroethylene) of from 0.033 percent by weight to 0.667 percent by weight, preferably from 0.1 percent by weight to 0.4 percent by weight, based on the total weight of the mixture, give the most satisfactory results.

For high density polyethylene, i.e. polyethylene having a density of from about 0.941 gram/cc. to about 0.965 gram/cc., amounts of poly(tetrafluoroethylene) of from 0.1 percent by weight to 0.667 percent by weight, preferably from 0.333 percent by weight to 0.667 percent by weight, based on the total weight of the mixture, are most effective.

Blends of low, medium, and high density polyethylene, or any of these, can also be intermixed with poly(tetrafluoroethylene), with the amount of poly(tetrafluoroethylene) employed depending upon the amount of each polyethylene present, and the combined density of the polyethylene blend.

Since the poly(tetrafluoroethylene) is incorporated into the polyethylene in rather small quantities, and since good distribution of the poly(tetrafluoroethylene) particles is essential, it is desirable to employ an aqueous dispersion of the polymer in effecting blending to help insure uniform distribution of the polymer in the polyethylene. In order to aid dispersion of the poly(tetrafluoroethylene) particles in the water, such dispersions preferably contain a suitable surfactant and are made slightly alkaline (e.g. a pH of about 8 is desirable) by the addition of ammonia or other substance which will impart a basic pH thereto. Preferably such dispersions contain a solids concentration of from about 1 percent by weight to about 70 percent by weight, most preferably from about 30 percent by weight to about 35 percent by weight.

If desired, the optical properties of the modified polyethylene of the instant invention can be further improved by the addition of a small amount of carbon black in addition to the poly(tetrafluoroethylene). The carbon black employed should be finely-divided and preferably of a particle size no larger than about 100 millimicrons, most preferably from about 5 millimicrons to about 20 millimicrons. When carbon black is employed in addition to poly(tetrafluoroethylene), it can be incorporated into the polyethylene in the same manner as the poly(tetrafluoroethylene), i.e. by blending on conventional blending equipment. In order to insure uniform dispersion of the carbon black in the polyethylene, it is desirable to employ a solution of the carbon black in mineral oil or other suitable solvent.

The following examples are set forth for purposes of illustration so that those skilled in the art may better understand this invention, and it should be understood that they are not to be construed as limiting this invention in any manner. The testing techniques employed in evaluating the products obtained, and referred to throughout the specification, are as follows:

Density—ASTM D-1505-60T, Method A
Melt index—D-1238-62T, Condition E
Haze—ASTM D-1003-61
Gloss—ASTM D-523-53T See-through—Determined by holding a plaque or film of a polymer about one foot in front of the eyes and determining the maximum distance (from chart to plaque or film) at which the 10 foot line on a standard AMA eye chart can be distinguished.

*Example 1*

Ninety-eight (98) parts by weight of a low density polyethylene resin (d.=0.920 gram/cc., M.I.=0.7 dg./min.) was blended with 2 parts by weight of an aqueous dispersion of poly(tetrafluoroethylene) by fluxing in a No. 0 Bolling mixer for 15 minutes at 135° C. under a pressure of 40 p.s.i. The dispersion employed had a pH of about 8 due to the presence of ammonia, and contained a solids content of about 33.3 percent by weight of poly(tetrafluoroethylene) particles having a particle size of about 200 millimicrons. This produced a composition having a poly(tetrafluoroethylene) concentration of 0.666 percent by weight.

The blend produced in this manner was then further blended in varying proportions with additional polyethylene of the same density and melt index to produce blends varying in poly(tetrafluoroethylene) concentration from 0.017 percent by weight to 0.266 percent by weight. Blending was effected in each instance by milling on a two-roll mill at a temperature of 140° C.

Each composition produced, as well as the original composition containing 0.666 percent by weight of poly(tetrafluoroethylene), and also unblended polyethylene of the same density and melt index, was compression molded at a temperature of 180° C. to produce plaques for use in testing optical properties. Table A below sets forth the optical properties for each of the plaques tested.

TABLE A

| Percent Poly-(tetrafluoroethylene) | Plaque Thickness, mils | Haze, percent | See-Through, inches |
|---|---|---|---|
| 0 | 21.8 | 71 | 127 |
| 0.017 | 21.0 | 56 | 143 |
| 0.033 | 20.8 | 48 | 143 |
| 0.066 | 21.9 | 48 | 156 |
| 0.133 | 20.1 | 38 | 142 |
| 0.266 | 20.6 | 39 | 134 |
| 0.666 | 19.3 | 38 | 127 |

Several of the compositions produced were also extruded intot 1.5 mil thick film at a temperature of 190° C. Table B below sets forth the optical properties for each of these films.

TABLE B

| Percent Poly-(tetrafluoroethylene) | Haze, percent | Gloss (60°) | See-Through, feet |
|---|---|---|---|
| 0 | 15.5 | 67 | 3 |
| 0.017 | 9.8 | 92 | 28 |
| 0.033 | 9.7 | 92 | 24 |
| 0.066 | 7.9 | 99 | 31 |
| 0.133 | 7.1 | 98 | 31 |

When a composition 0.066% poly(tetrafluoroethylene) and 2 parts per million of carbon black having a particle size of 9 millimicrons was extruded into a film in the same manner as above, the resulting film had a haze of 7.6%, a gloss of 101.3, and a see-through of 32 feet. The composition employed was prepared by fluxing the polyethylene in a No. 0 Bolling mixer for 5½ minutes at 135° C. with a blend of polyethylene (of the same density and melt index), poly(tetrafluoroethylene), and carbon black. The blend employed in preparing the final composition had been prepared by fluxing 96 parts of the polyethylene in a No. 0 Bolling mixer for 15 minutes at 135° C. with 2 parts of the aqueous dispersion of poly(tetrafluoroethylene) and 2 parts of still another blend containing 90 parts of the polyethylene and 10 parts of an emulsion of carbon black in mineral oil. The latter blend had been prepared by milling the polyethylene on a two-roll mill at a temperature of 140° C. with an emulsion of 1 part of carbon black in 99 parts of mineral oil.

*Example 2*

Ninety-eight (98) parts by weight of a blend of 40 parts by weight of a high density polyethylene resin (d.=0.96 gram/cc., M.I.=3.0 dg./min.) and 60 parts by weight of a low density polyethylene resin (d.=0.922 gram/cc., M.I.=1.6 dg./min.) were blended with 2 parts by weight of an aqueous dispersion of poly(tetrafluoroethylene) by fluxing in a No. 0 Bolling mixer for 15 minutes at 135° C. under a pressure of 40 p.s.i. The dispersion employed had a pH of about 8 due to the presence of ammonia, and contained a solids content of about 33.3 percent by weight of poly(tetrafluoroethylene) particles having a particle size of about 200 millimicrons. This produced a composition having a poly(tetrafluoroethylene) concentration of 0.666 percent by weight.

The blend produced in this manner was then further blended in varying proportions with additional amounts of the original polyethylene blend to produce blends varying in poly(tetrafluoroethylene) concentration from 0.017 percent by weight to 0.433 percent by weight. Blending was effected in each instance by milling on a two-roll mill at a temperature of 140° C.

Each composition produced, as well as the original blend of the high density and low density polyethylenes, and also the composition containing 0.666 percent by weight of poly(tetrafluoroethylene), was compression molded at a temperature of 180° C. to produce plaques for use in testing optical properties. Table C below sets forth the optical properties for each of the plaques tested.

TABLE C

| Percent Poly-(tetrafluoroethylene) | Plaque Thickness, mils | Haze, percent | See-Through, inches |
|---|---|---|---|
| 0 | 19.5 | 98 | 0 |
| 0.017 | 19.9 | 85 | 51 |
| 0.033 | 18.9 | 87 | 53 |
| 0.066 | 19.8 | 77 | 56 |
| 0.133 | 18.9 | 76 | 65 |
| 0.266 | 18.2 | 71 | 67 |
| 0.433 | 19.0 | 53 | 100 |
| 0.666 | 19.8 | 52 | 87 |

*Example 3*

Ninety-eight (98) parts by weight of a medium density polyethylene resin (d.=0.935 gram/cc., M.I.=2.0 dg./min.) was blended with 2 parts by weight of an aqueous dispersion of poly(tetrafluoroethylene) by fluxing in a No. 0 Bolling mixer for 15 minutes at 135° C. under a pressure of 40 p.s.i. The dispersion employed had a pH of about 8 due to the presence of ammonia, and contained a solids content of about 33.3 percent by weight of poly(tetrafluoroethylene) particles having a particle size of about 200 millimicrons. This produced a composition having a poly(tetrafluoroethylene) concentration of 0.666 percent by weight.

The blend produced in this manner was then further blended in varying proportions with additional polyethylene of the same density and melt index to produce blends varying in poly(tetrafluoroethylene) concentration from 0.017 percent by weight to 0.433 percent by weight. Blending was effected in each instance by milling on a two-roll mill at a temperature of 140° C.

Each composition produced, as well as the original compositon containing 0.666 percent by weight of poly(tetrafluoroethylene), and also unblended polyethylene of the same density and melt index, was compression molded at a temperature of 180° C. to produce plaques for use in testing optical properties. Table D below sets forth the optical properties for each of the plaques tested.

TABLE D

| Percent Poly-(tetrafluoroethylene) | Plaque Thickness, mils | Haze, percent | See-Through, inches |
|---|---|---|---|
| 0 | 19.0 | 83 | 69 |
| 0.017 | 17.9 | 51 | 100 |
| 0.033 | 18.2 | 14 | 92 |
| 0.066 | 19.9 | 41 | 104 |
| 0.133 | 18.8 | 38 | 99 |
| 0.266 | 18.4 | 39 | 114 |
| 0.433 | 19.4 | 33 | 111 |
| 0.666 | 20.0 | 50 | 90 |

*Example 4*

Ninety-eight (98) parts by weight of a high density polyethylene resin (d.=0.96 gram/cc., M.I.=3.0 dg./min.) was blended with 2 parts by weight of an aqueous dispersion of poly(tetrafluoroethylene) by fluxing in a No. 0 Bolling mixer for 15 minutes at 140° C. under a pressure of 40 p.s.i. The dispersion employed had a pH of about 8 due to the presence of ammonia, and contained a solids content of about 33.3 percent by weight of poly(tetrafluoroethylene) particles having a particle size of about 200 millimicrons. This produced a composition having a poly(terafluoroethylene) concentration of 0.666 percent by weight.

The blend produced in this manner was then further blended in varying proportions with additional polyethylene of the same density and melt index to produce blends varying in poly(tetrafluoroethylene) concentration from 0.017 percent by weight to 0.433 percent by weight. Blending was effected in each instance by milling on a two-roll mill at a temperature of 145° C.

Each composition produced, as well as the original composition containing 0.666 parts by weight of poly(tetrafluoroethylene), and also unblended polyethylene of the same density and melt index, was compression molded at a temperature of 180° C. to produce plaques for use in testing optical properties. Table E below sets forth the optical properties for each of the plaques tested.

TABLE E

| Percent Poly-(tetrafluoroethylene) | Plaque Thickness, mils | Haze, percent | See-Through, inches |
|---|---|---|---|
| 0 | 17.4 | 100 | 0 |
| 0.017 | 18.4 | 99 | 0 |
| 0.033 | 16.1 | 93 | 13 |
| 0.066 | 17.3 | 95 | 17 |
| 0.133 | 17.7 | 95 | 24 |
| 0.266 | 18.1 | 93 | 30 |
| 0.433 | 17.5 | 87 | 30 |
| 0.666 | 17.9 | 96 | 25 |

What is claimed is:

1. A process for producing polyethylene composition suitable for producing films having improved optical properties which comprises blending polyethylene having a melt index of from about 0.01 decigram/minute to about 30 decigrams/minute, and a density of from about 0.910 gram/cc. to about 0.965 gram/cc., with poly(tetrafluoroethylene) having a particle size smaller than 1000 millimicrons, at a temperature above the melting point of the polyethylene but below the melting point of the poly(terafluoroethylene), wherein the poly(tetrafluoroethylene) is blended into the polyethylene as an aqueous dispersion so as to form a composition containing from 0.015 percent by weight to about 1.7 percent by weight of poly(tetrafluoroethylene).

2. A process for producing a polyethylene composition suitable for producing films having improved optical properties which comprises blending polyethylene having a melt index of from about 0.01 decigram/minute to about 30 decigrams/minute, and a density of from about 0.910 gram/cc. to about 0.965 gram/cc., with poly(tetrafluoroethylene) having a particle size of from about 100 millimicrons to about 500 millimicrons, at a temperature above the melting point of the polyethylene but below the melting point of the poly(tetrafluoroethylene), wherein the poly(tetrafluoroethylene) is blended into the polyethylene as an aqueous dispersion so as to form a composition containing from 0.015 percent by weight to 0.333 percent by weight of poly(tetrafluoroethylene).

3. A process for producing a polyethylene composition suitable for producing films having improved optical properties which comprises blending polyethylene having a melt index of from about 0.01 decigram/minute to about 30 decigrams/minute, and a density of from about 0.910 gram/cc. to about 0.925 gram/cc., with poly(tetrafluoroethylene) having a particle size of from about 100 millimicrons to about 500 millimicrons, at a temperature above the melting point of the polyethylene but below the melting point of the poly(tetrafluoroethylene), wherein the poly(tetrafluoroethylene) is blended into the polyethylene as an aqueous dispersion so as to form a composition containing from 0.666 percent by weight to 0.134 percent by weight of poly(tetrafluoroethylene).

4. A process for producing a polyethylene composition suitable for producing films having improved optical properties which comprises blending polyethylene having a melt index of from about 0.01 decigram/minute to about 30 decigrams/minute, and a density of from about 0.926 gram/cc. to about 0.940 gram/cc., with poly(tetrafluoroethylene) having a particle size of from about 100 millimicrons to about 500 millimicrons, at a temperature above the melting point of the polyethylene but below the melting point of the poly(tetrafluoroethylene), wherein the poly(tetrafluoroethylene) is blended into the polyethylene as an aqueous dispersion so as to form a composition containing from 0.333 percent by weight to 0.677 percent by weight of poly(tetrafluoroethylene).

5. A process for producing a polyethylene composition suitable for producing films having improved optical properties which comprises blending polyethylene having a melt index of from about 0.01 decigram/minute to about 30 decigrams/minute, and a density of from about 0.926 gram/cc. to about 0.940 gram/cc., with poly(tetrafluoroethylene) having a particle size of from about 100 millimicrons to about 500 millimicrons, at a temperature above the melting point of the polyethylene but below the melting point of the poly(tetrafluoroethlyene), wherein the poly(tetrafluoroethylene) is blended into the polyethylene as an aqueous dispersion so as to form a composition containing from 0.1 percent by weight to 0.4 percent by weight of poly(tetrafluoroethylene).

6. A process for producing a polyethylene composition suitable for producing films having improved optical properties which comprises blending polyethylene having a melt index of from about 0.01 decigram/minute to about 30 decigrams/minute, and a density of from about 0.941 gram/cc. to about 0.965 gram/cc., with poly(tetrafluoroethylene) having a particle size of from about 100 millimicrons to about 500 millimicrons, at a temperature above the melting point of the polyethylene but below the melting point of the poly(tetrafluoroethylene), wherein the poly(tetrafluoroethylene) is blended into the polyethylene as an aqueous dispersion so as to form a composition containing from 0.1 percent by weight to 0.667 percent by weight of poly(tetrafluoroethylene).

7. A process for producing a polyethylene composition suitable for producing films having improved optical properties which comprises blending polyethylene having a melt index of from about 0.01 decigram/minute to about 30 decigrams/minute, and a density of from about 0.941 gram/cc. to about 0.965 gram/cc., with poly(tetrafluoroethylene) having a particle size of from about 100 millimicrons to about 500 millimicrons, at a temperature above the melting point of the polyethylene but below the melting point of the poly(tetrafluoroethylene), wherein the poly(tetrafluoroethylene) is blended into the polyethylene as an aqueous dispersion so as to form a composition containing from 0.333 percent by weight to 0.667 percent by weight of poly(tetrafluoroethylene).

8. A process as in claim 1 wherein the said polyethylene and the said poly(tetrafluoroethylene) are blended at a temperature within the range of between about 110° C. and about 190° C.

9. A process as in claim 1 wherein the said polyethylene and the said poly(tetrafluoroethylene) are blended at a temperature within the range of between about 120° C. and about 190° C.

References Cited

UNITED STATES PATENTS

| | | | |
|---|---|---|---|
| 2,681,324 | 6/1954 | Hochberg | 260—897 |
| 2,951,047 | 8/1960 | Lantos | 260—897 |
| 3,005,795 | 10/1961 | Busse et al. | 260—897 |
| 3,226,351 | 12/1965 | Werber et al. | 260—29.6 |

OTHER REFERENCES

Last: J. Poly. Sci. 39, pp. 543–545 (1959).
Kuhre et al.: SPE J., pp. 1113–1119 (October 1964).

MURRAY TILLMAN, *Primary Examiner.*

T. G. FIELD, *Assistant Examiner.*